US006191702B1

(12) United States Patent
Ishida

(10) Patent No.: US 6,191,702 B1
(45) Date of Patent: Feb. 20, 2001

(54) DATA DISPLAY RADIO PAGER

(75) Inventor: Takayasu Ishida, Shizuoka (JP)

(73) Assignee: NEC Corporation, Tokyo (JP)

(*) Notice: Under 35 U.S.C. 154(b), the term of this patent shall be extended for 0 days.

(21) Appl. No.: 08/864,450

(22) Filed: May 28, 1997

(30) Foreign Application Priority Data

May 28, 1996 (JP) ........................................ 8-133713

(51) Int. Cl.[7] ........................................ H04Q 7/00

(52) U.S. Cl. ........................ 340/825.44; 340/825.31; 345/50

(58) Field of Search ........................ 340/825.44, 311.1, 340/825.31, 825.34; 455/38.2–38.4, 31.2, 31.3, 38.1; 345/61, 33, 34, 38, 50, 59; 380/54; 379/170, 217

(56) References Cited

U.S. PATENT DOCUMENTS 4,766,434 * 8/1988 Matai et al. .................... 340/825.44
5,012,234 * 4/1991 Dulaney et al. ................ 340/825.44
5,025,252 * 6/1991 DeLuca et al. ................ 340/825.44
5,146,217 9/1992 Holmes et al. ................ 340/825.44
5,493,284 * 2/1996 Kondo ........................ 340/825.44
5,798,708 * 8/1998 Katayama .................... 340/825.44
5,828,313 * 10/1998 Mochizuki .................... 340/825.44
5,933,088 * 8/1999 Lipp ........................ 340/825.44

FOREIGN PATENT DOCUMENTS 0218936 4/1987 (EP) .
1-295228 11/1989 (JP) .
2-15721 1/1990 (JP) .
4-115729 4/1992 (JP) .
4-246928 9/1992 (JP) .
5-128116 5/1993 (JP) .

OTHER PUBLICATIONS

Patent Abstracts of Japan, vol. 14, No. 65 (E–0884), Feb. 6, 1990.

* cited by examiner

*Primary Examiner*—Seema S. Rao
(74) *Attorney, Agent, or Firm*—Sughrue, Mion, Zinn, Macpeak & Seas, PLLC

(57) ABSTRACT

A data display radio pager of the present invention is capable of displaying data received from a base station and consisting of a message signal and an address signal on an LCD (Liquid Crystal Display) either in a complete form or in a n incomplete form, i.c., partly omitted form or rearranged form. The pager allows the user to select desired one of the complete and incomplete forms and thereby protects important or private messages from illicit access.

5 Claims, 14 Drawing Sheets

DATA DISPLAY RADIO PAGER

BACKGROUND OF THE INVENTION

The present invention relates to a data display radio pager and, more particularly, to a data display radio pager capable of allowing the user of the pager to select a desired message display method.

Today, diversified and international social and economic activities are supported by data communications systems. This, coupled with diversifying lifestyle and broadening range of activities, has increased the demand for mobile communication services which can be shared by many people at low cost. Handy phone systems, cordless systems, radio paging systems and so forth extensively used today implement such a communication system. Up-to-date radio paging systems in particular have multiple functions and offer not only the traditional paging using an alert tone, but also various kinds of message services. The user of a data display radio pager is capable of carrying the pager and causing it to display a message in the form of numerals or a fixed or an unfixed sentence by way of example.

However, the problem with the conventional data display radio pager is that a message received from a base station is displayed on, e.g., an LCD in its complete form. As a result, even a person other than the user of the pager can easily see the content of the message appearing on the LCD. The pager therefore cannot protect important or private messages meant for the user from the third party's illicit access.

SUMMARY OF THE INVENTION

It is therefore an object of the present invention to provide a data display radio pager capable of allowing the user of the pager to select a desired method of displaying received data.

In accordance with the present invention, in a radio pager capable of displaying received alphanumeric character data consisting of a message signal and an address signal, a first display controller and a second display controller are provided, and each displays the same received data by a particular method.

Also, in accordance with the present invention, a data display radio pager includes an LCD for displaying received data consisting of a message signal and an address signal. A first memory stores an address number and a password assigned to the radio pager, and various kinds of set data beforehand. A second memory stores the received data meant for the radio pager and a time of receipt while the radio pager is in a stand-by state. A first display driver controls all the segment lines and all the common lines of the LCD in accordance with the received data to thereby display the received data on the LCD. A second display driver is preset beforehand to interrupt control over desired ones of the segment lines and desired one of the common lines, thereby displaying only a part of the received data on the LCD. An alert driver drives at least one of a sounder, a vibrator, and a visual indicator. A switch section is manually operable to input various kinds of request information. A controller controls the first and second display drivers and alert driver by referencing the first memory.

Further, in accordance with the present invention, a radio pager includes an LCD for displaying received data consisting of a message signal and an address signal. A first memory stores an address number and a password assigned to the radio pager, and various kinds of set data beforehand. A second memory stores the received data meant for the radio pager and a time of receipt while the radio pager is in a stand-by state. A display driver controls all the segment lines and all the common lines of the LCD in accordance with the received data. An alert driver drives at least one of a sounder, a vibrator, and a visual indicator. A switch section is manually operable to input various kinds of request information. A controller controls the display drivers and alert driver by referencing the first memory.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
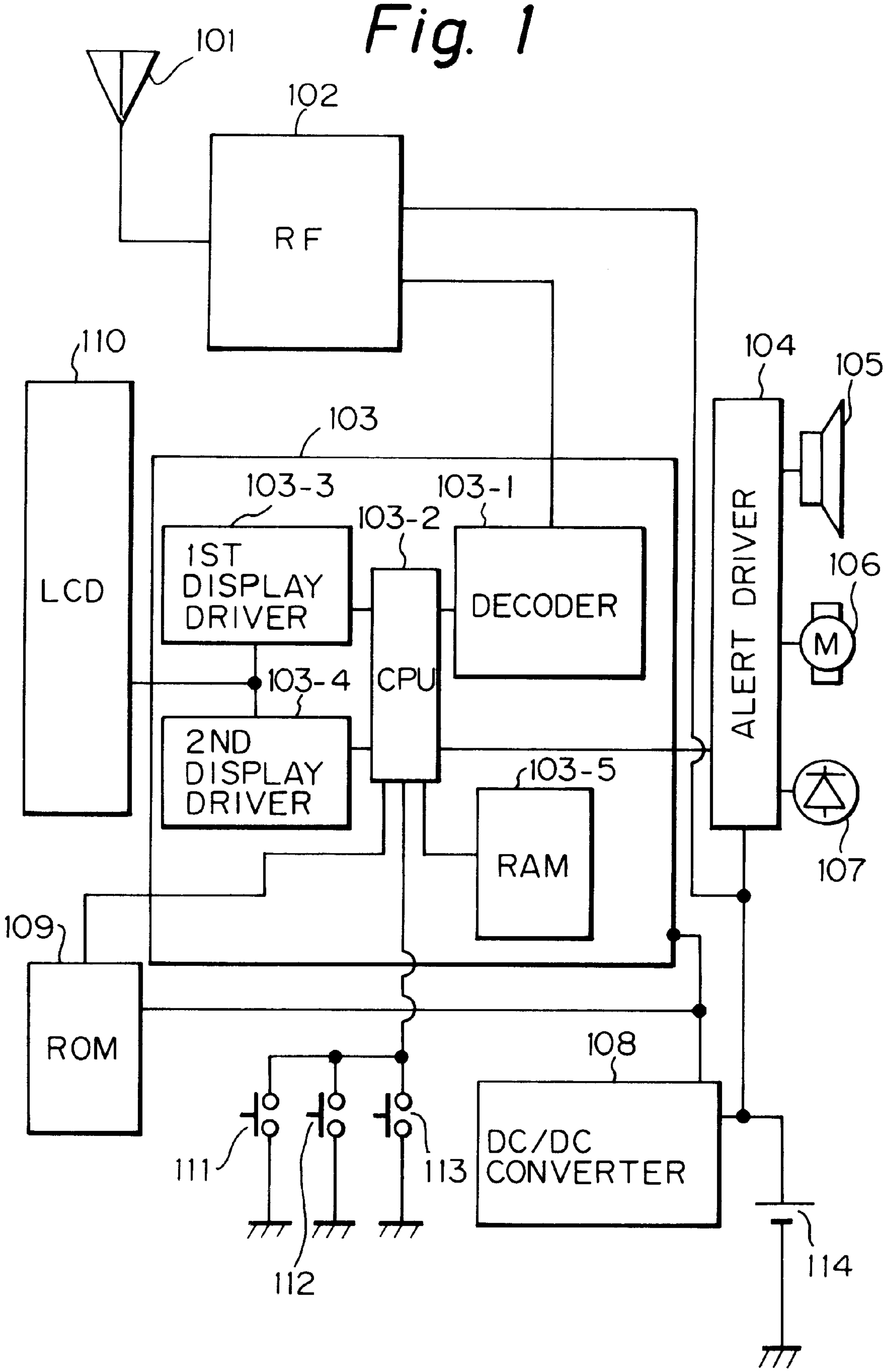
FIG. 1 is a block diagram schematically showing a n essential part of a data display radio pager embodying the present invention.

Referring to FIG. 1 of the drawings, a data display radio pager embodying the present invention is shown. As shown, the radio pager includes an antenna 101 and a radio section or RF (Radio Frequency) 102. A paging signal sent from a base station, not shown, comes in through the antenna 101 and is applied to RF the 102. The RF 102 demodulates the paging signal. Let the paging signal be referred to as received data hereinafter. A controller 103 controls the entire pager. An alert driver 104 drives a speaker 105, a vibrator 106 and/or an LED (Light Emitting Diode) 107, as will be described specifically later. A ROM (Read Only Memory) 109 stores an address number assigned to the pager, methods of displaying the received data and so forth beforehand. An LCD 110 displays the received data together with the time of receipt.

There are also shown in FIG. 1 a DC/DC converter 108, a power switch 111, display method select switches 112 and 113, and a battery 114.

The controller 103 is made up of a decoder 103-1, a CPU (Central Processing Unit) 103-2, a first and a second LCD driver 103-3 and 103-4, and a RAM (Random Access Memory) 103-5. The decoder 103-1 decodes the demodulated paging signal output from the RF 102. The first LCD driver 103-3 is capable of controlling all the segment lines and all the common lines included in the LCD 110. The second LCD driver 103-4 is preset by, e.g., dip switches such that it interrupts the control over desired ones of the segment lines and desired one of the common lines of the LCD 110. The RAM 103-5 is used to store the received information together with the time of receipt.

The illustrative embodiment allows the user of the pager to register a desired method of displaying the received data, as follows. In the embodiment, the power switch 111 turns on when continuously pressed for more than 1 second, or turns off when pressed twice at a short interval. When the switch 111 turned on is pressed once for less than 1 second, a password setting mode is set up. When the switch 111 is pressed once for less than 1 second after a password has been input, the password is registered. Further, when either one of the display mode select switches 112 and 113 is pressed, and then the power switch 111 is pressed once for less than 1 second, a desired method of displaying a received message is registered. The select switch 112 sets up a complete display mode in which a received message fully appears on the LCD 110 in the order of receipt The other select switch 113 sets up a incomplete display mode in which only a part of a received message appears in the order of receipt or in a rearranged order.

Figure 3A:
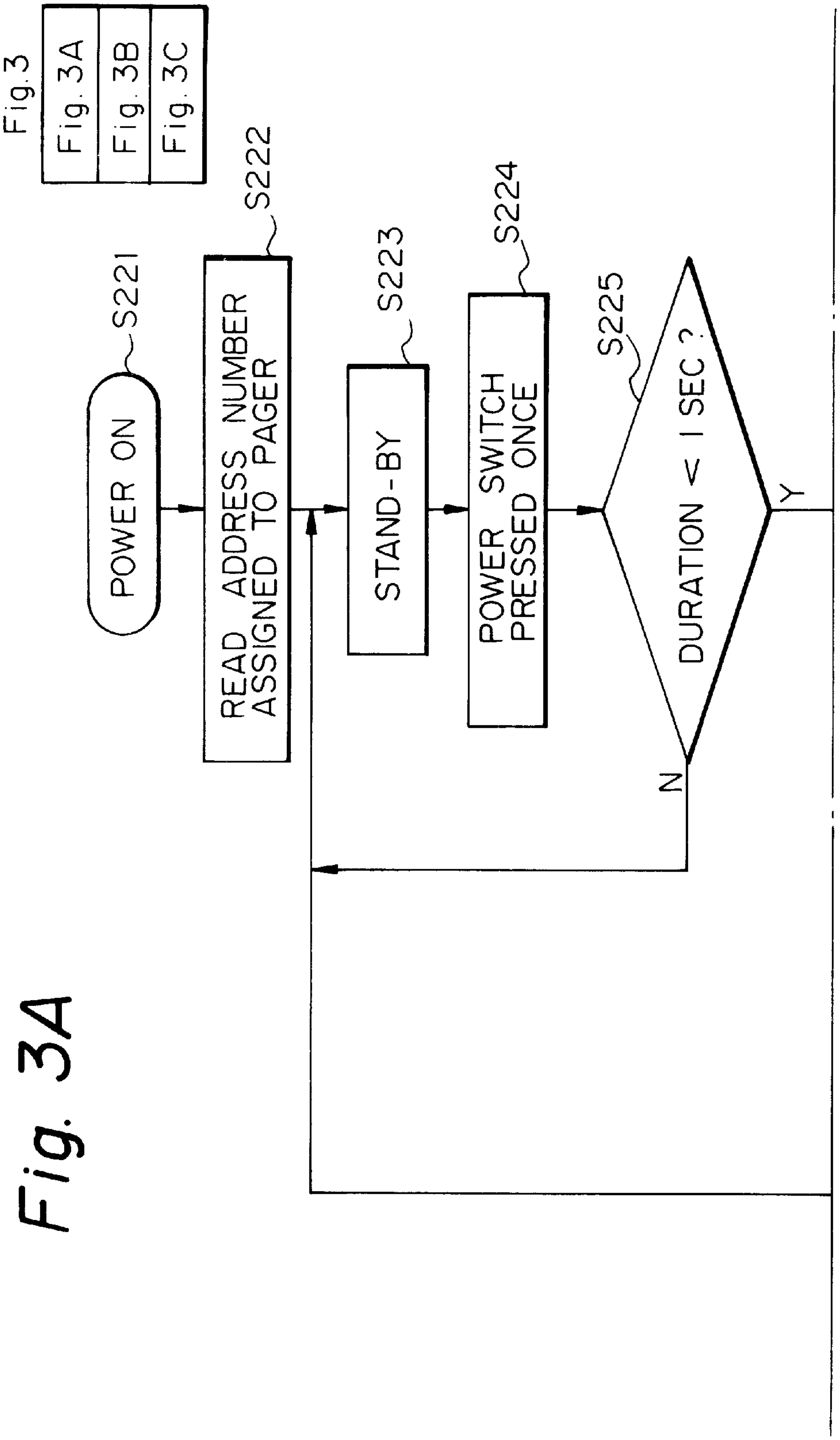
FIGS. 3*a*, 3*b*, and 3*c* form a composite drawing which is a flowchart demonstrating a procedure for controlling the writing and reading of the received data and also particular to the embodiment.
Figure 3B:
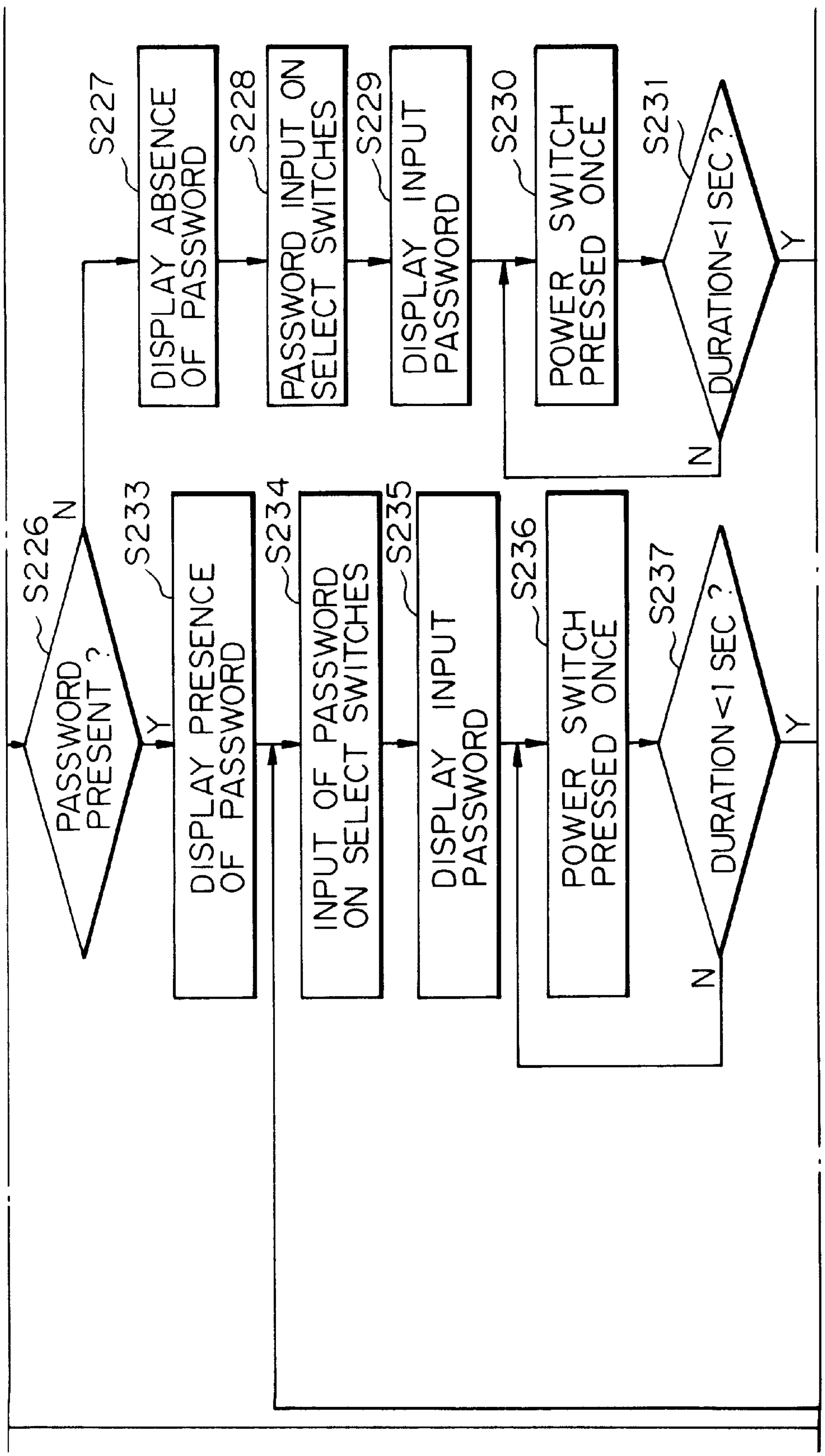
Figure 3C:
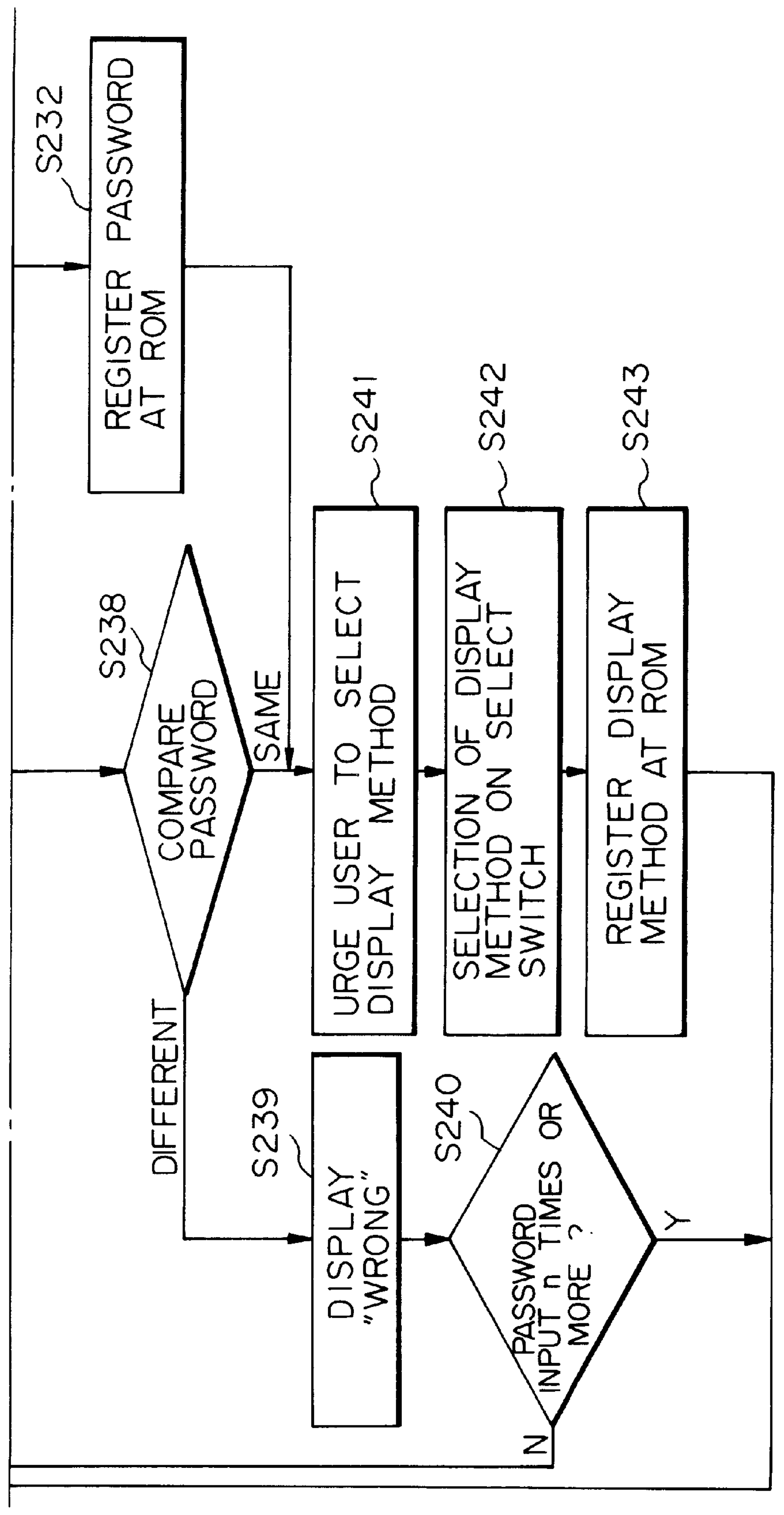

Reference will be made to FIG. 3 for describing how the embodiment allows the user of the pager to register a desired method of displaying received data. As shown, when the power switch 111 is pressed for more than 1 second, it turns on (step S221). Then, the CPU 103-2 of the controller 103 writes the various information stored in the ROM 109 and including the address number in the RAM 103-5 (step S222), and sets up a stand-by state (step S223). When the RF 102 receives a paging signal via the antenna 101, the CPU 103-2 compares the address number written to the RAM 103-5 and an address number or signal contained in the paging signal. If the two address numbers are identical, the CPU 103-2 waits for data to follow the address number.

In the above condition, assume that the user of the pager presses the power switch 111 once (step S224). Then, the CPU 103-2, monitoring the duration of operation of the switch 111, determines whether or not the switch 111 h as been pressed for less than 1 second (step S225). If the answer of the step S225 is positive (Y), the CPU 103-2 scans the RAM 103-5 to see if a password bas been registered or not (step S226). If the answer of the step S226 is negative (N), the CPU 103-2 displays on the LCD 110 a message indicative of the absence of a password (step 3227).

Seeing the above message on the LCD 110, the user operates the display mode select switches 112 and 113 in order to input his or her own password while watching the LCD 110 (step S228). On confirming the password on the LCD 110 (step S229), the user presses the power switch 111 once for a short period of time (step S230). The CPU 103-2 determines whether or not the switch 111 has been pressed once for less than 1 second (step S231). If the answer of the step S231 is Y, the CPU 103-2 writes the password in the ROM 109 (step S232) and ends the procedure for registering a new password.

If the answer of the step S226 is Y, i.e., if a password is present, the CPU 103-2 displays on the LCD 110 a message indicative of the presence of a password (step S233). On confirming this message, the user operates the display mode select switches 112 and 113 in order to input the password while watching the LCD 110 (step S234). On confirming the password on the LCD 110 (step S235), the user presses the power switch 111 for a short period of time (step S236). In response, the CPU 103-2 determines whether or not the switch 111 has been pressed once for less than 1 second (step S237). If the answer of the step S237 is Y, the CPU 103-2 compares the password input on the switches 112 and 113 and the password registered at the RAM 103-5 (step S238). If the two passwords are the same as each other, or if a password is newly registered at the step S232, the CPU 103-2 displays on the LCD 110 a message urging the user to select a desired method of displaying a received message, e.g., "1:2" (step S241). In the specific message "1:2", "1" and "2" are representative of the previously mentioned complete display mode and incomplete display mode, respectively.

The user operates the display mode select switch 112 or 113 in order to select "1" or "2" appearing on the LCD 110 (step S142). Assume that the switches 112 and 113 are assigned to "1" and "2", respectively. On detecting the operation of the switch 112 or 113, the CPU 103-2 registers "1" or "2" designated by the user at the ROM 109 (step 5243).

If the two passwords are different from each other, a determined in the step S238, the CPU 103-2 displays a particular message on the LCD 110, showing the user that the password input on the switches 112 and 113 is wrong (step S239). Then, the user again inputs a password on the switches 112 and 113. As a result, the steps S234–S238 are repeated. If the input password is different from the registered password even after n consecutive times of comparison (Y, step S240), the CPU 103-2 suspends the password registration procedure and returns to the step S223. Such a procedure prevents a person other than the user from registering a password illicitly and reading an important or private message meant for the user.

Figure 2A:
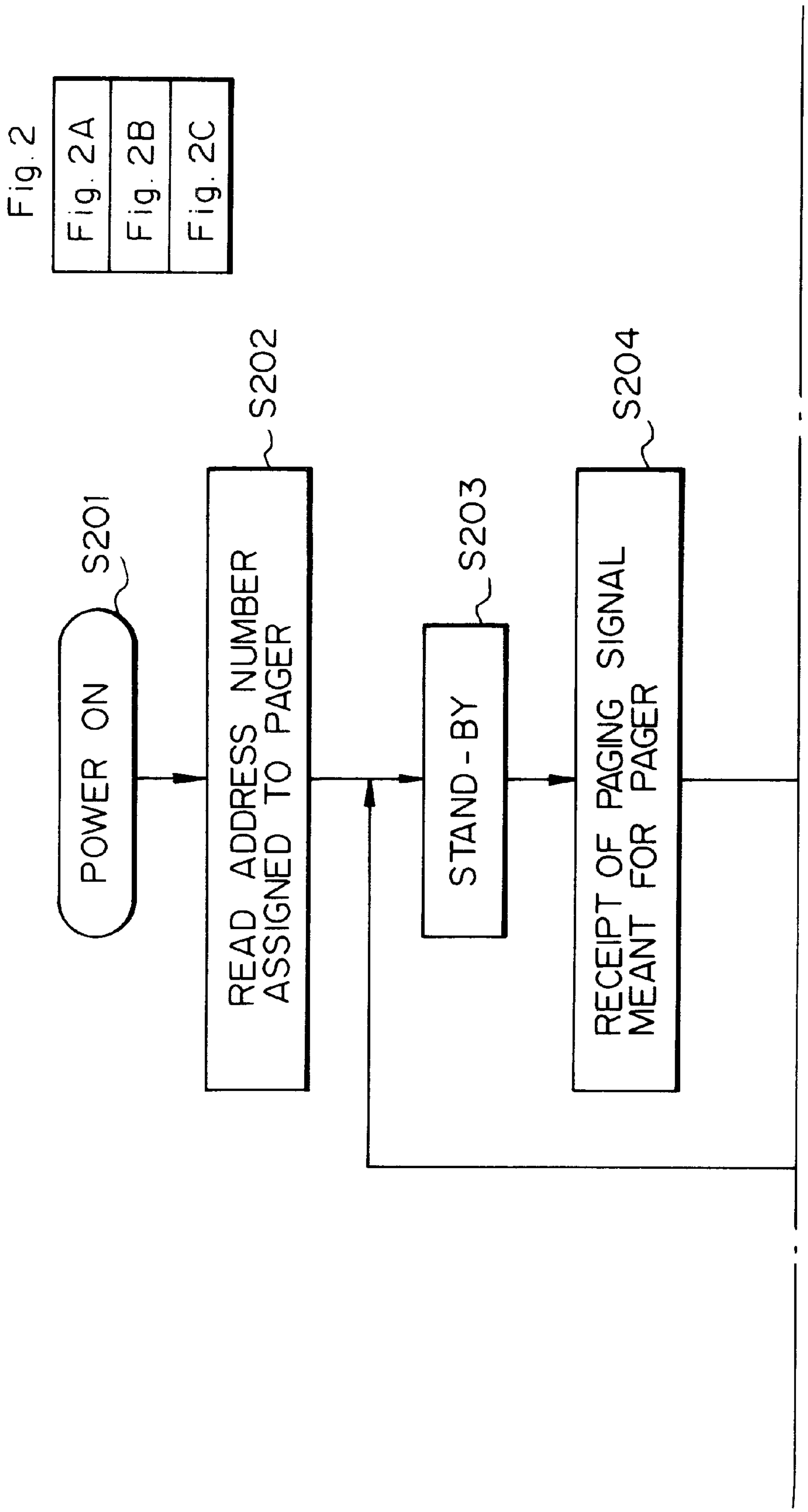
FIGS. 2*a*, 2*b*, and 2*c* form a composite drawing which is a flowchart demonstrating a procedure for controlling the setting of a received data display method and particular to the embodiment.
Figure 2B:
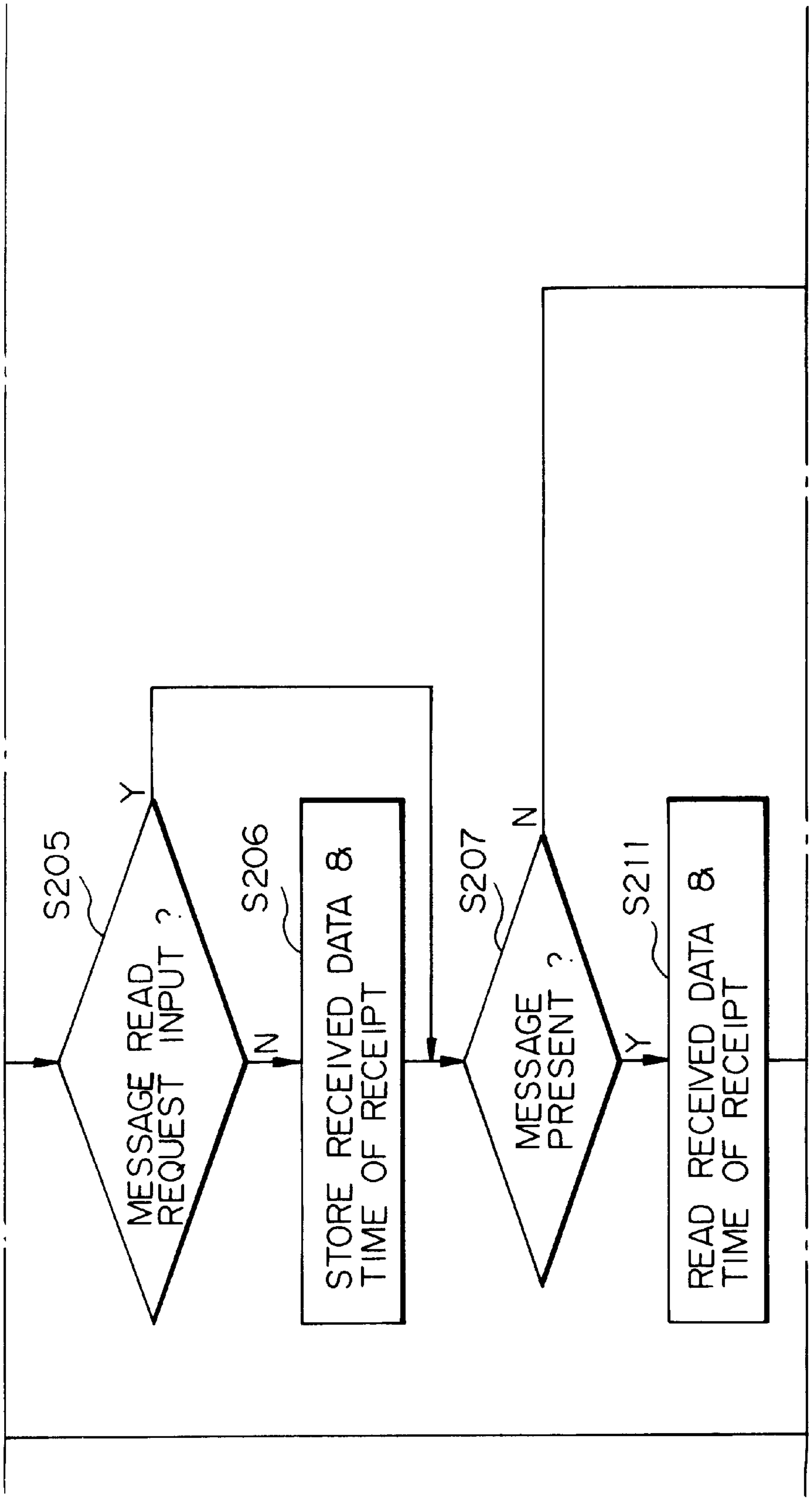
Figure 2C:
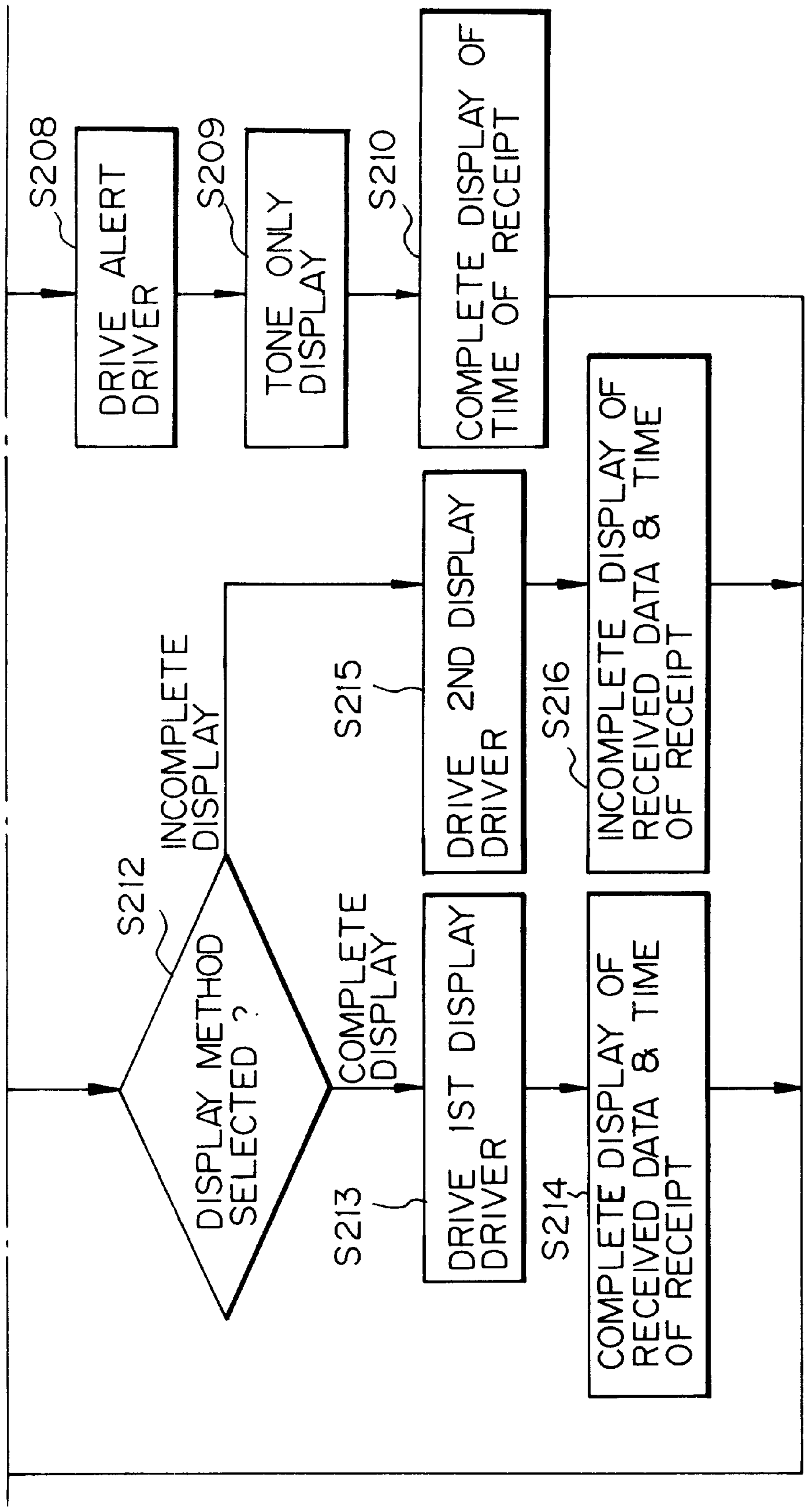

FIG. 2 shows a procedure for writing received data and reading them out and available with the illustrative embodiment As shown, the power switch 111 turns on when pressed for more than 1 second (step S201). Then, the CPU 103-2 writes the various information stored in the ROM 109 and including the address number in the RAM 103-5 (step S202), and sets up a stand-by state (step S203). When the RF 102 receives a paging signal via the antenna 101, the CPU 103-2 compares the address signal written to the RAM 103-5 and the address number contained in the paging signal, and then receives the paging signal (received data) (step S204). Subsequently, the CPU 103-2 determines whether or not a message read request is input on the pager (step S205). If the answer of the step S20is Y, the CPU 103-2 executes a step S207. If the answer of the step S20is N, the CPU 103-2 writes the received data in the RAM 103-5 together with the time of receipt (step S206).

If a message read request is input on the pager (Y, step S205), the CPU 103-2 scans the RAM 103-to see if the received data include a message (step S207). If the answer of the step S207 is N, i.e., if only the address number and the time of receipt exist in the RAM 103-5, the CPU 103-2 causes the alert driver 104 to effect tone only display (step S209).

At the same time, the CPU 103-2 causes the first display driver 103-3 to display the address number and the time of receipt on the LCD 110 (step S210). For the tone only display, one or more of the speaker 105, vibrator 106 and LED 107 are energized. The condition wherein only the address number and the time of receipt are stored in the RAM 103-5 occurs when the calling person did not input any message.

Figure 7A:
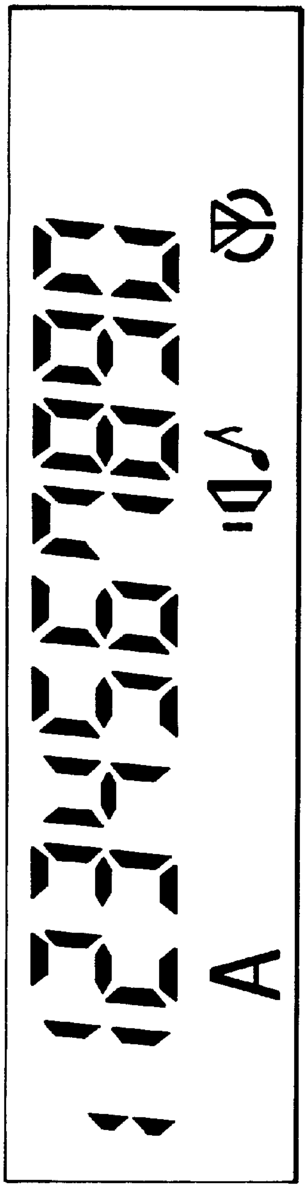
FIG. 7A shows specific received data appearing on the LCD in a complete form in accordance with the present invention.

If a message is present, as determined in the step S207, the CPU 103-2 reads the received data and the time of receipt out of the RAM 103-5 (stop S211), and then searches for the display method registered at the ROM 109 previously (see FIG. 3) (step S212). If the display method is "1" representative of the complete display mode, the CPU 103-2 drives the first display driver 103-3 (step S213) so as to display the whole received message on the LCD 110 in the order in which they have been written to the RAM 103-5, as shown in FIG. 7A specifically (step S214).

Figure 7B:
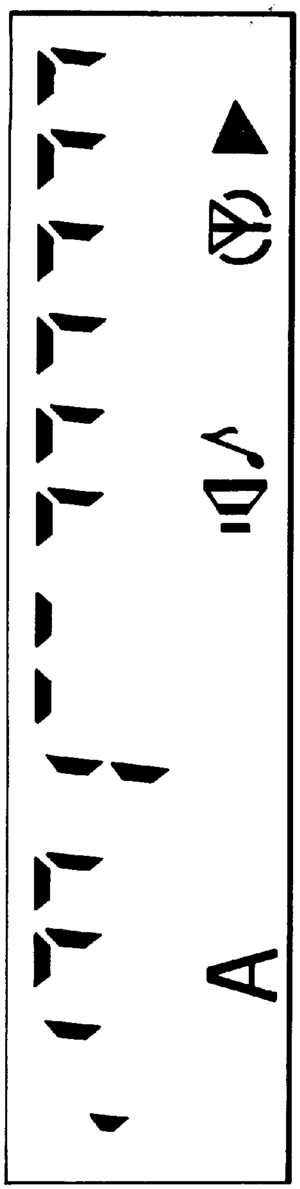
FIG. 7B shows the received data appearing on the LCD in a partly omitted form in accordance with the present invention.

If the display mode "2" representative of the incomplete display mode is registered, the CPU 103-2 drives the second display driver 103-4 (step S215). As a result, the received data stored in the RAM 103-5 appear on the LCD 110 in the order in which they have been written to the RAM 103-5, but each in a partly omitted form, as shown in FIG. 7B specifically (step S216). This kind of display successfully prevents an person other than the user from reading the message meant for the user.

For the incomplete display of the received data, desired ones of the segment lines and desired ones of the common lines of the LCD 110 are intentionally not controlled FIG. 7B shows a specific case wherein the control over the odd segment lines and the second common line (COM1) is interrupted. This can be done only if the second or incomplete display driver 103-4 is provided with dip switches, not shown, in one-to-one correspondence to the segment lines and common lines, and if the lines not to be controlled in the incomplete display mode are preset on the switches.

Figure 4:
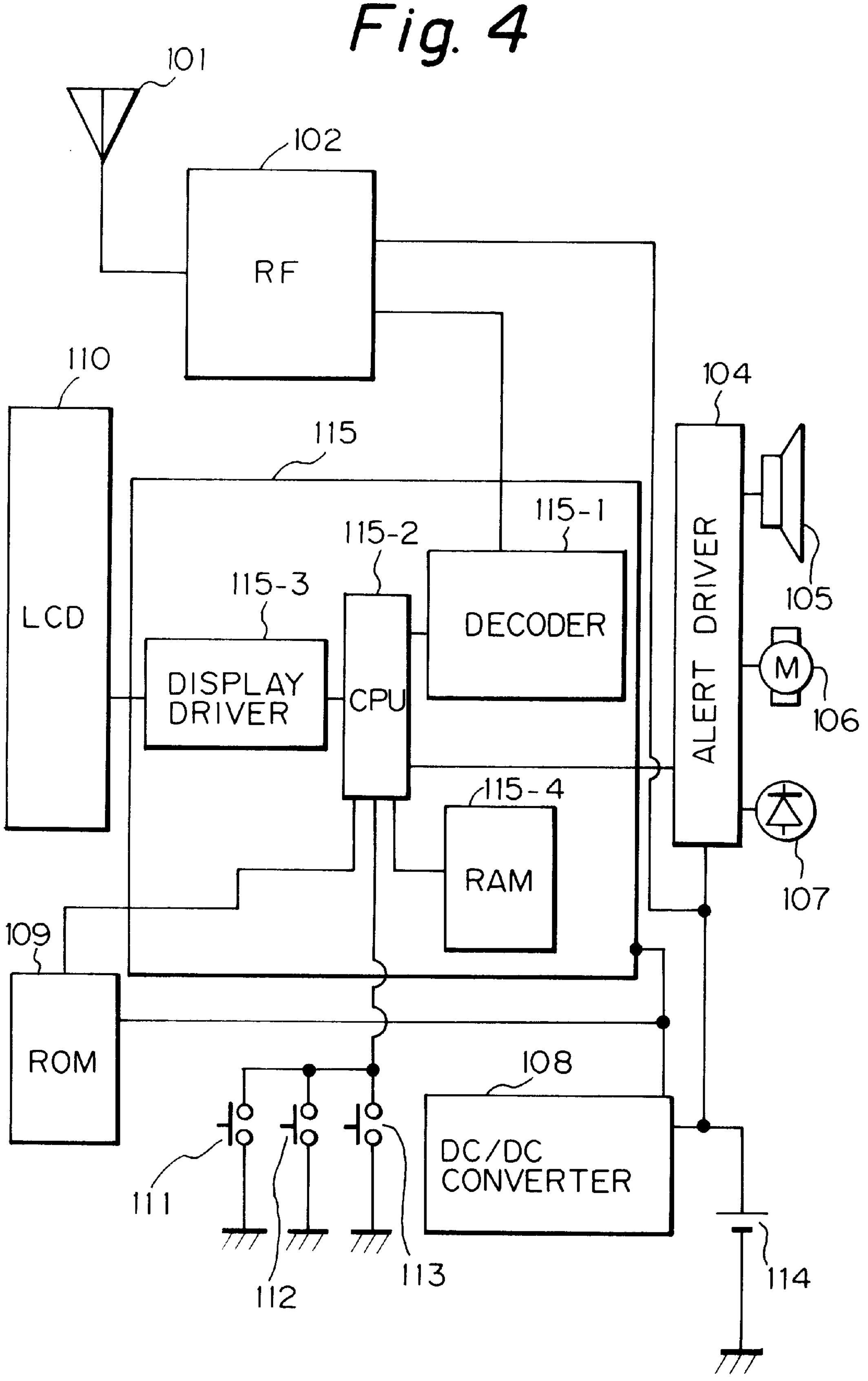
FIG. 4 is a schematic block diagram showing an essential part of an alternative embodiment of the present invention.

Referring to FIG. 4, an alternative embodiment of the present invention will be described. This embodiment is identical with the previous embodiment except for the configuration of the controller. As shown, a controller 115 is made up of a decoder 115-1, a CPU 115-2, an LCD driver 115-3, and a RAM 115-4. The decoder 115-1, like the decoder 103-1, decodes a received paging signal. The LCD driver 115-3 is capable of controlling all the segment lines and all the common lines of the LCD 110. The RAM 115-4 is used to store received data together with the time of receipt.

Figure 5A:
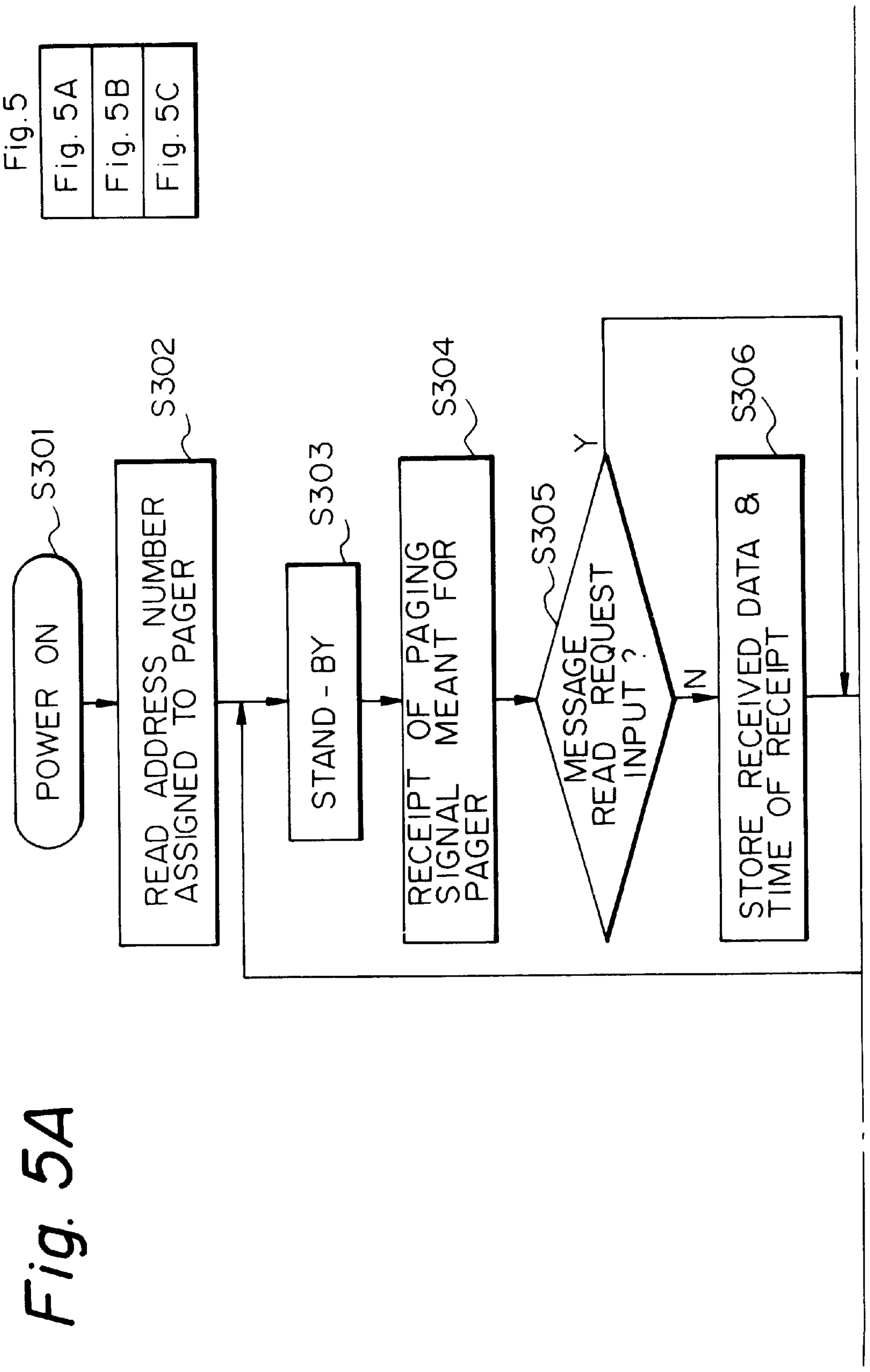
FIGS. 5*a*, 5*b*, and 5*c* form a composite drawing which is a flowchart showing a procedure for writing and reading received data and available with the alternative embodiment.
Figure 5B:
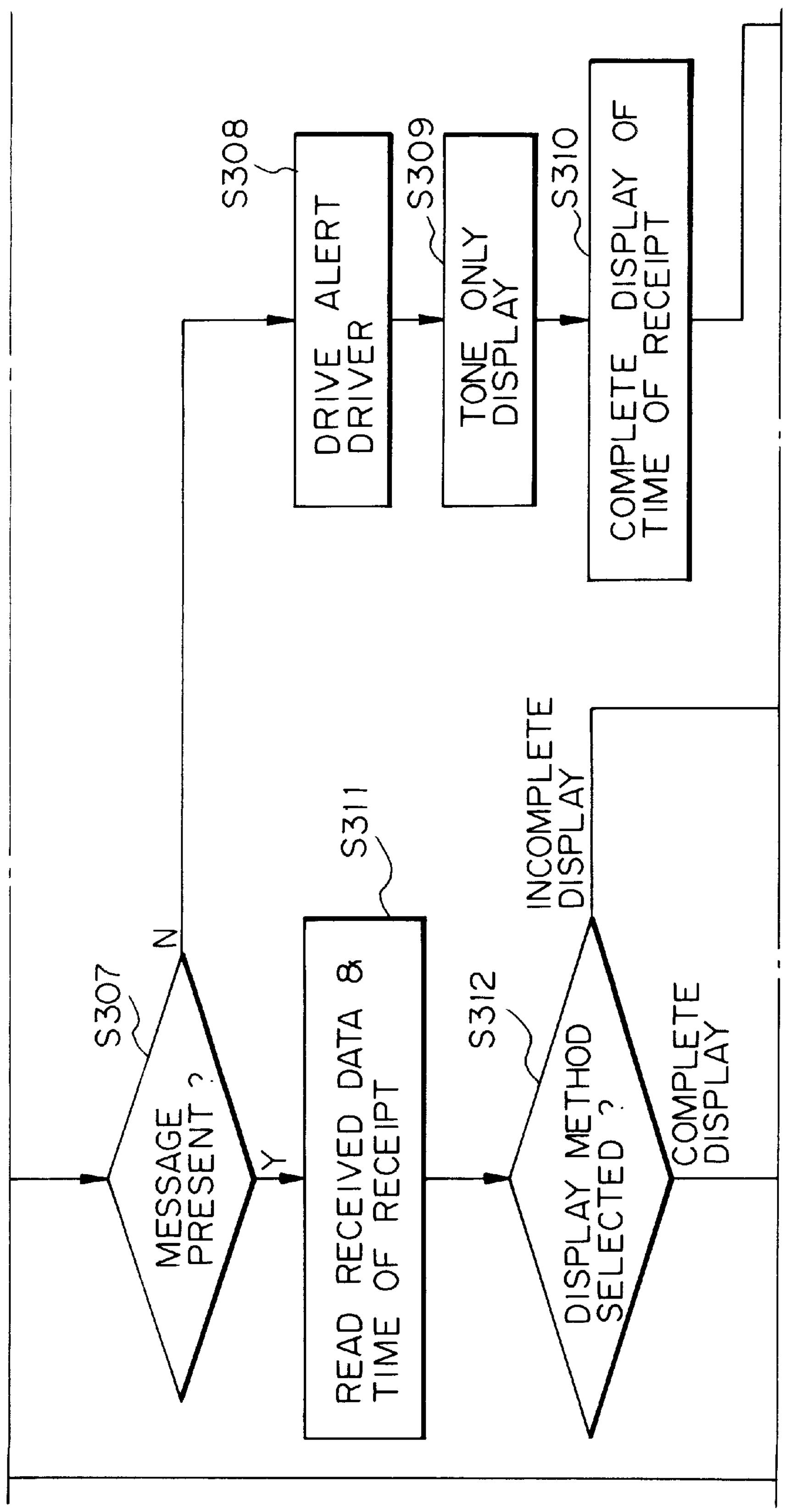
Figure 5C:
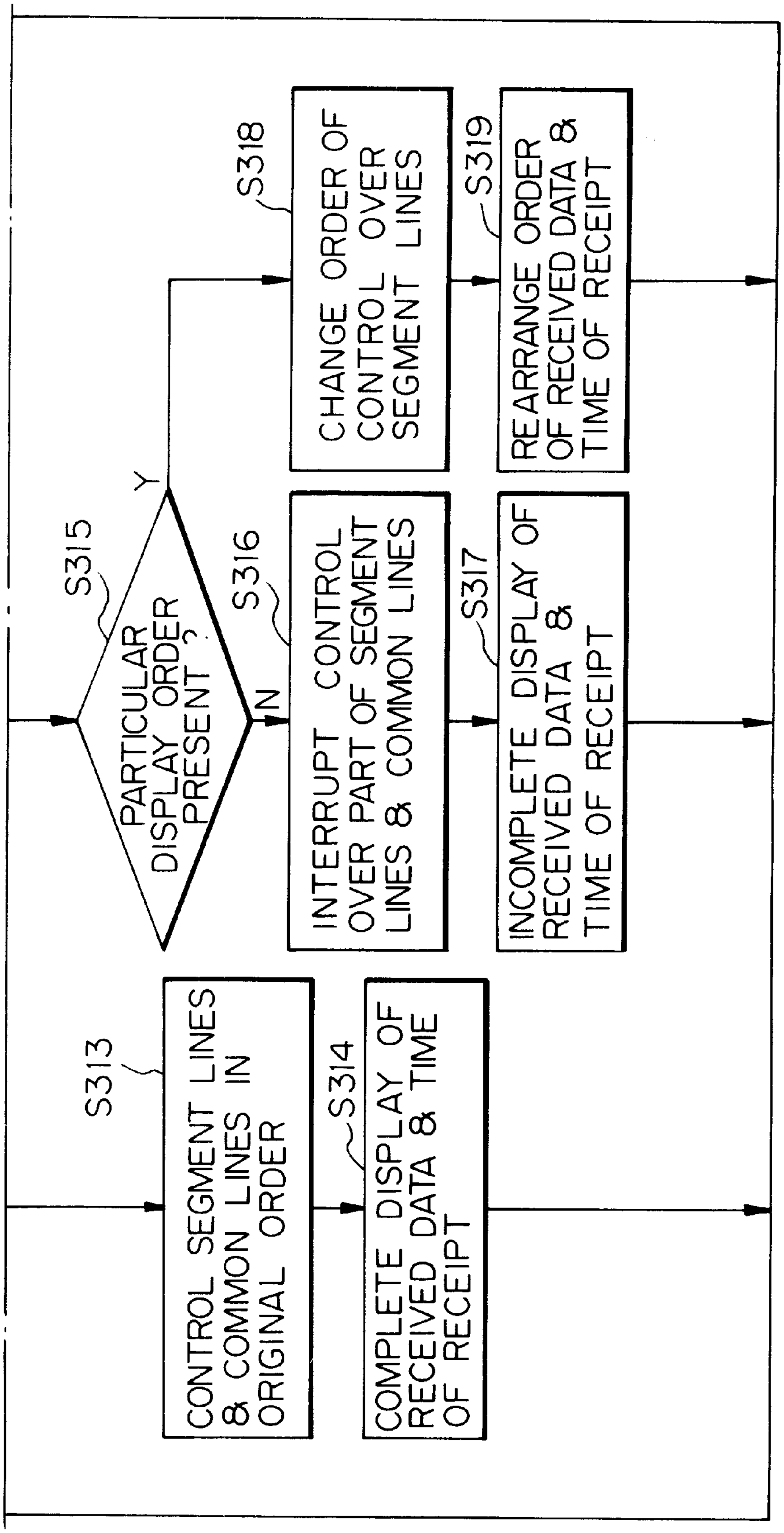
Figure 6A:
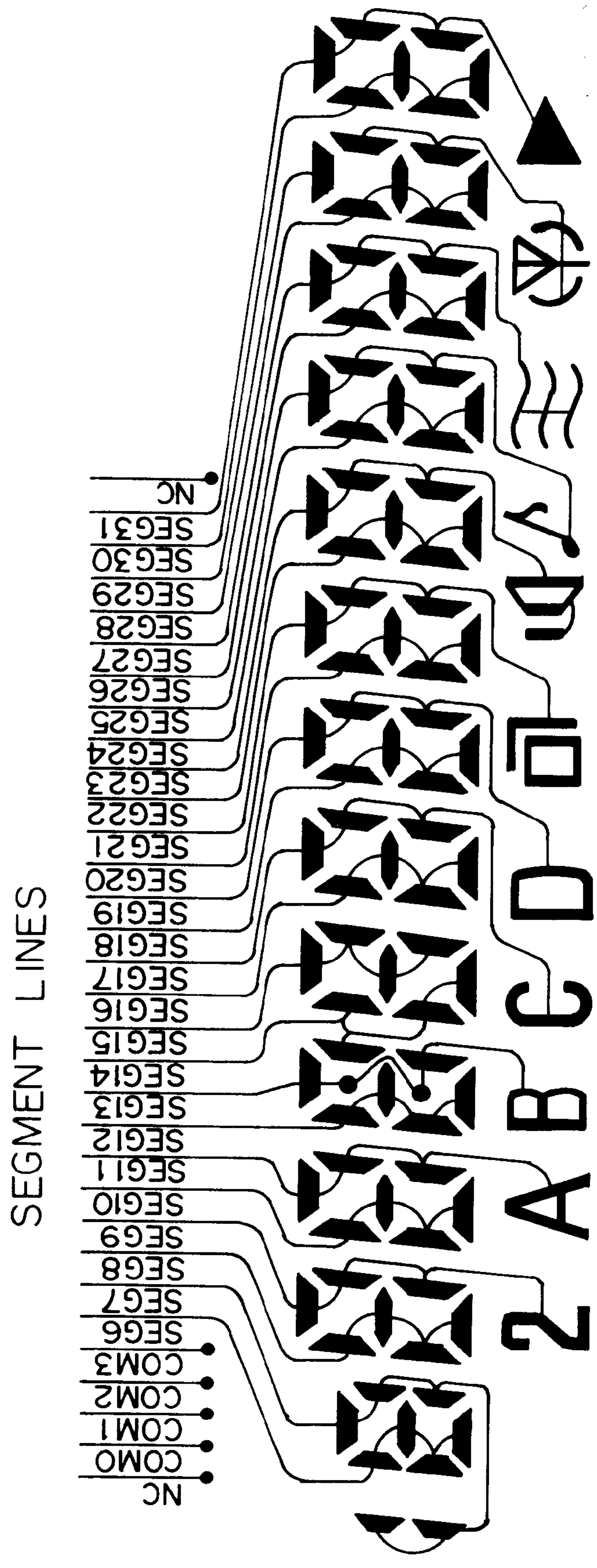
FIG. 6A shows the arrangement of segment lines included in an LCD in accordance with the present invention
Figure 6B:
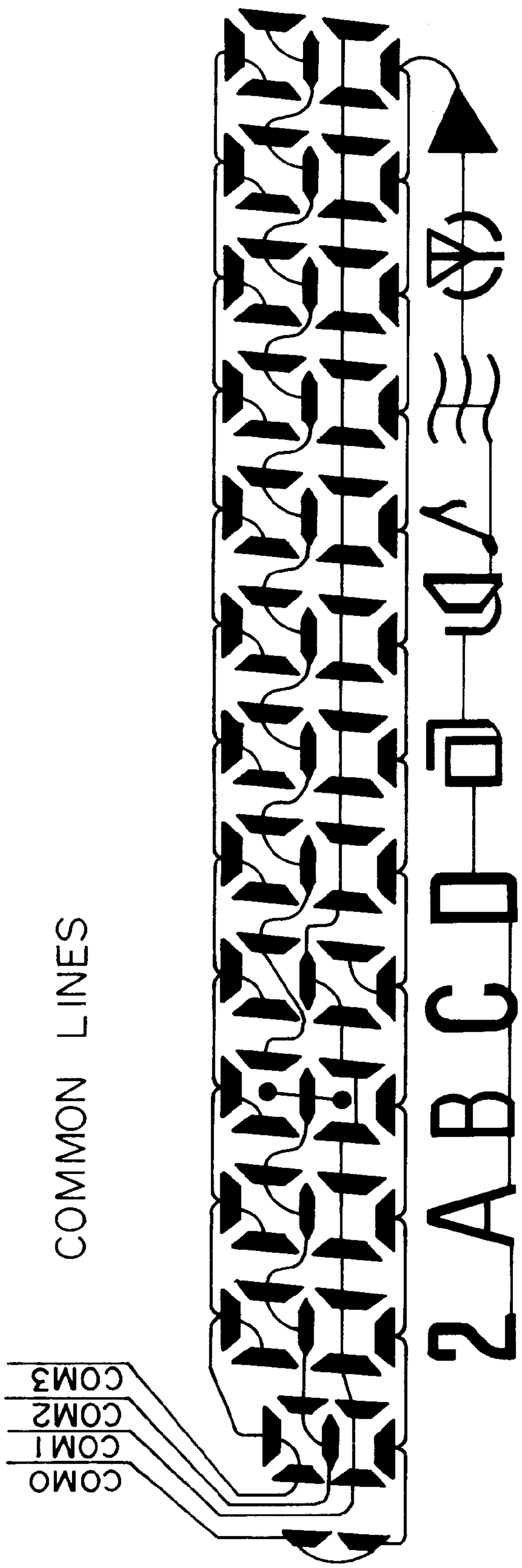
FIG. 6B shows the arrangement of common lines also included in the LCD.

Reference will be made to FIG. 5 for describing how the alternative embodiment writes received data and reads them out. The procedure for registering the method of displaying received data is identical with the procedure of the previous embodiment and will not be described in order to avoid redundancy, Also, steps 3301–S312 are identical with the steps S201–S212 shown in FIG. 2 and will not be described for the same purpose. The following description will concentrate on a step S312 and successive steps.

In the step S312, if the display method selected is "1" representative of the complete display mode, the CPU 115-2 causes the display driver 115-3 to control the segment lines and common lines of the LCD 110 in the original order (step S313). As a result, the received data and the time of receipt appear on the LCD 110 in the order in which they have been written to the RAM 115-5 (step S314), as shown in FIG. 7A specifically.

If the display method selected is "2" representative of the incomplete display, the CPU 115-2 determines whether or not a particular order of display is specified (step S315). In the illustrative embodiment, the particular order of display is written to the ROM 109 by a preselected method beforehand. When the particular order of display is absent (N, step S315), the CPU 115-2 causes the first display driver 115-3 to interrupt the control over a part of the segment lines and common lines in accordance with segment and common control information stored in the ROM 109 beforehand (step S316). As a result, the received data and the time of receipt appear on the LCD 110 in the order in which they have been written to the RAM 115-5, but each in a partly omitted form, as shown in FIG. 7B specifically (step S317).

Figure 7C:
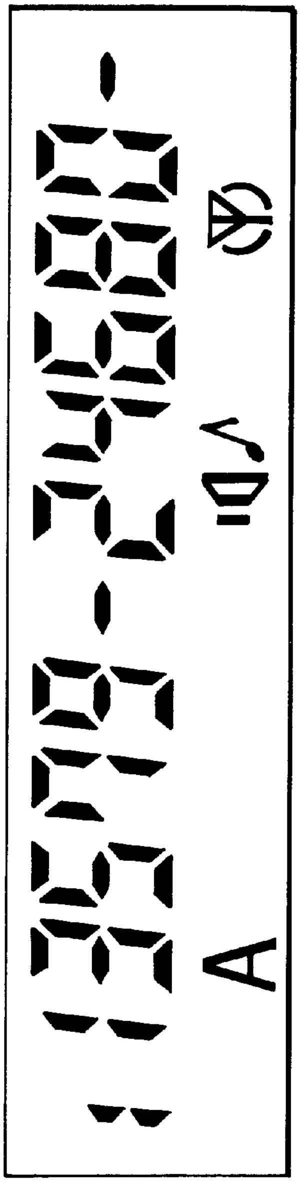
FIG. 7C shows the received data appearing on the LCD in a rearranged form in accordance with the present invention.

If the particular order of display is present (Y, step S315), the CPU 115-2 causes the display driver 115 to control the segment lines of the LCD 110 in accordance with the particular order of display stored in the ROM 109 (step S318). Consequently, the received data and the time of receipt appear on the LCD 110 in an order different from the order in which they have been written to the RAM 115-5 (step S319), as shown in FIG. 7C specifically. In FIG. 7, dashes appearing between and at the end of the data show the user that the message is displayed in a rearranged order.

To replace the partly omitted or rearranged received data and the time of receipt FIG. 7 or 7C) with complete or original ones, the steps S224–S243 shown in FIG. 3 are executed in order to substitute the display method "1" for the display method "2". Subsequently, the steps S307 and S311–S314 are executed. As a result, the received data and the time of receipt appear on the LCD 110 in their complete form, so the user can read them easily.

While the illustrative embodiments have concentrated on received data in the form of numerals, they are, of course, practicable even with fixed or unfixed sentences.

In summary, it will be seen that the present invention provides a data display radio pager having various unprecedented advantages as enumerated below.

(1) The user of the pager is allowed to register beforehand a desired display method which causes received data and the time of receipt to appear on an LCD in an incomplete form, i.e., partly omitted form or rearranged form. When received data and the time of receipt appear on the LCD in the incomplete form, the user inputs his or her own password in order to replace the incomplete form with the complete or original form. This causes the received data to appear on the LCD in the complete form, so the user can read them easily. As a result, the secrecy of the received data meant for the user can be guaranteed.

(2) Because the above replacement of the display method cannot be done without resorting to the password, persons other than the user are prevented from reading the received data stored in the pager.

(3) If a first and a second display driver assigned to the complete display and incomplete display, respectively, are provided, and if control over the incomplete display is preset on, e.g., switches, the content of the incomplete display can be easily changed. In addition, the first and second display drivers can be implemented by hardware only, the pager cuts down the development cost.

(4) When a single display driver is provided for controlling both the complete and incomplete display by software, the pager is reduced in size.

(5) The control over the incomplete display does not need any special scramble control which would increase the production cost of the pager.

Various modifications will become possible for those skilled in the art after receiving the teachings of the present disclosure without departing from the scope thereof.

What is claimed is:

1. A data display radio pager, comprising:

a display, having segment and common lines;

a first memory storing an address of said radio pager;

a second memory storing received data;

a first display driver for outputting control signals to control said segment and common lines of said display to display characters on said display based on said received data;

a second display driver for interrupting said control of said first display driver over predetermined ones of said segment and common lines, so that, for one or more of said characters, only a part of said one or more of said characters is displayed on said display;

a switch section for manually inputting password information and mode request information; and a controller controlling said first display driver and said second display driver, said controller controlling second display driver to perform said interrupting based on a display mode indicated by said mode request information, said display mode being one of a complete display mode with complete characters displayed and an incomplete display mode with said one or more of said characters having only a part of said character displayed.

2. A radio pager as claimed in claim 1, wherein said controller further comprises:

a display method registering section for:

responding to said mode request information, by searching said first memory for a registered password;

when said registered password is not present, providing a password input request and storing an input password as said registered password;

when said registered password is present, providing said password input request and responding to an input password by making a comparison between said input password and said registered password; and when said comparison indicates a match between said registered password and said input password, accepting and registering said display mode information;

a first display control section for:

receiving a received data read request via said switch section;

responding to said received data read request by determining whether said received data stored in said second memory contains a message;

when said received data contains said message, reading said received data including a respective message time of receipt; and when said complete display mode is detected, driving said first display driver to display said received data and said time of receipt in said complete form;

a second display control section for driving, when said incomplete display mode is detected, said second display driver to perform said interrupting;

a display switching section for replacing, in response to an operation of said switch section, said incomplete display mode of said second display control means with said complete display mode of said first display control means, and vice versa; and an alert control section for displaying, when said received data stored in said second memory does not contain said message, respective address and time of receipt, and driving said first display driver to display said address and time of receipt in said complete form.

3. A radio pager as claimed in claim 2, wherein said alert control section further causes the generation of an alert comprising at least one of sound, vibration, and visible indication.

4. A radio pager comprising:

an LCD for displaying received data including a message signal and an address signal;

a first memory for storing an address number and a password of said radio pager;

a second memory for storing said received data meant for said radio pager and a time of receipt while said radio pager is in a stand-by state;

a display driver for controlling all segment lines and all common lines of said LCD in accordance with said received data;

an alert driver for driving at least one of a sounder, a vibrator, and a visual indicator;

a switch section for accepting input information, including request information from a user;

a controller for controlling said display driver and said alert driver by referencing said first memory, wherein said controller comprises:

display method registering means for:

determining, in response to a display method register request input on said switch section, whether a registered password is present in said first memory, displaying, when said registered password is present, a password input request on said LCD, displaying, when a password input on said switch section matches said password present in said first memory, a display method select request on said LCD for requesting designation of only one of a first display mode and a second display mode, said first display mode indicating data display in a complete form and said second display mode indicating data in an incomplete form, and registering said first display mode or said second display mode in accordance with a user input to provide a registered display mode;

first display control means for:

determining, on receiving a received data read request via said switch section, whether said received data stored in said second memory contains a message, reading, when said received data contains said message, said received data together with said time of receipt, searching said first memory to detect said registered display mode; and sending control signals over all said segment lines and all said common lines of said LCD in accordance with said received data when said registered display mode is said first display mode, to display said received data and said time of receipt on said LCD in said complete form;

second display control means for:

searching said first memory, when said registered display mode is said second display mode, to determine the presence of a predetermined order of display, and when said particular order of display is absent and said registered display mode is said second display mode, preventing control by said first display control over preselected ones of said segment lines and preselected one of said common lines by interrupting said control signals of said first display control means so as to permit the display of only a part of said received information and said time of receipt on said LCD in said incomplete form;

third display control means for changing, when said predetermined order of display is present and said registered display mode is said second display mode, an order in which ones of said common lines and segment lines are to be controlled, thereby displaying parts of characters of said received data and said time of receipt in a rearranged order;

display switching means for selectively switching, in response to an operation of said switch section, between said second display mode and said first display mode; and alert control means for reading address and time information out of said second memory, when said received data stored in said second memory contains no message, and controlling all said segment lines and all said common lines to thereby display said address and time information in said complete form, and driving said alert driver to produce a tone only display.

5. A radio pager as claimed in claim 4, wherein said tone only display is implemented by at least one of sound, vibration, and visible indication.

* * * * *

UNITED STATES PATENT AND TRADEMARK OFFICE

CERTIFICATE OF CORRECTION

PATENT NO. : 6,191,702 B1 
DATED : February 20, 2001
INVENTOR(S) : Takayasu Ishida It is certified that error appears in the above-identified patent and that said Letters Patent is hereby corrected as shown below:

Title page,
ABSTRACT,
Line 5, delete, "i.c." insert -- i.e. --

Column 1,
Line 34, after "received" insert -- alphanumeric character --;
Line 36, delete "alphanumeric character"

Column 2,
Line 53, delete "to RF the" insert -- to the RF section --

Column 4,
Line 24, delete "5243" insert -- S243 --;
Line 52, delete "Szois" insert -- S205 --

Column 5,
Line 6, delete "(stop S211)" insert -- (step S211);
Line 50, delete "3301-S312" insert -- S301-S312 --

Column 6,
Line 17, after "dashes" insert -- (-) --;
Line 21, delete "(FIG. 7 or 7C) insert -- FIG. 7B or 7C --

Signed and Sealed this

Fifth Day of March, 2002

*Attest:*

JAMES E. ROGAN

*Attesting Officer* *Director of the United States Patent and Trademark Office*